(12) United States Patent
Kandogan et al.

(10) Patent No.: US 7,362,243 B2
(45) Date of Patent: *Apr. 22, 2008

(54) APPARATUS AND METHOD USING COLOR-CODED OR PATTERN-CODED KEYS IN TWO-KEY INPUT PER CHARACTER TEXT ENTRY

(75) Inventors: Eser Kandogan, San Jose, CA (US); Shumin Zhai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 894 days.

This patent is subject to a terminal disclaimer.

(21) Appl. No.: 09/991,140

(22) Filed: Nov. 16, 2001

(65) Prior Publication Data

US 2003/0095053 A1 May 22, 2003

(51) Int. Cl.
*H03M 11/00* (2006.01)

(52) U.S. Cl. .................... 341/22; 345/168; 379/368; 379/433.07

(58) Field of Classification Search .................... 341/22; 400/486; 345/168, 169, 179; 379/368, 433.07
See application file for complete search history.

(56) References Cited

U.S. PATENT DOCUMENTS

| | | | |
|---|---|---|---|
| 3,967,273 A | 6/1976 | Knowlton | 340/365 S |
| 4,012,599 A | 3/1977 | Meyer | 179/84 VF |
| 4,307,266 A * | 12/1981 | Messina | 379/88.23 |
| 4,344,069 A * | 8/1982 | Prame | 341/26 |
| 4,381,502 A * | 4/1983 | Prame | 341/26 |
| 4,555,193 A * | 11/1985 | Stone | 400/486 |
| 4,585,908 A * | 4/1986 | Smith | 379/93.18 |
| 4,825,464 A | 4/1989 | Wen | |
| 4,927,279 A | 5/1990 | Morgan | 400/486 |
| 4,988,997 A * | 1/1991 | Prame | 341/25 |
| 5,058,046 A | 10/1991 | Lapeyre | 364/709.16 |

(Continued)

FOREIGN PATENT DOCUMENTS

WO        WO 94/15431    *    7/1994

OTHER PUBLICATIONS

*Triangular Toggle Keys for Touch-Tone Phones*, IBM Technical Disclosure Bulletin, Jun. 1988, pp. 47-48.

(Continued)

*Primary Examiner*—Timothy Edwards, Jr.
(74) *Attorney, Agent, or Firm*—Daniel E. Johnson

(57) ABSTRACT

Letters (more generally, language symbols) are entered electronically by selecting, in sequential fashion, two keys on a standard phone layout. The first key in the two-key sequence is that key on which the desired letter is displayed. The keys and the letters displayed on the keys are marked in such a way that the markings suggest the second key in the two-key sequence. The letters displayed on the keys have respective markings, such as a color, with each letter on a given key having a unique marking. The keys themselves also have markings that match the markings of the letters. In preferred embodiments, the two keys in the two-key sequence are located in the same row. Letters may be selected to spell out words on a screen and then sent electronically to a remote device or recipient.

14 Claims, 12 Drawing Sheets

U.S. PATENT DOCUMENTS

| | | |
|---|---|---|
| 5,392,338 A | 2/1995 | Danish et al. |
| 5,408,060 A | 4/1995 | Muurinen .................. 200/314 |
| 5,452,960 A | 9/1995 | Kuhlenschmidt ........... 400/487 |
| 5,477,262 A | 12/1995 | Banker et al. ................. 348/7 |
| 5,818,437 A | 10/1998 | Grover et al. |
| 5,982,303 A | 11/1999 | Smith .......................... 341/22 |
| 6,011,554 A | 1/2000 | King et al. ................. 345/352 |
| 6,043,761 A | 3/2000 | Burrell, IV ................. 341/23 |
| 6,184,803 B1 | 2/2001 | Burrell, IV ................. 341/22 |
| 6,205,332 B1 * | 3/2001 | Novel ..................... 455/426.1 |
| 6,205,342 B1 | 3/2001 | Oakes et al. ................ 455/566 |
| 6,232,892 B1 | 5/2001 | Burrell, IV .................. 341/22 |
| 6,286,064 B1 | 9/2001 | King et al. ................... 710/67 |
| 6,761,462 B2 * | 7/2004 | Yoshida ..................... 362/109 |
| 6,765,556 B2 | 7/2004 | Kandogan et al. |

OTHER PUBLICATIONS

M. Silfverberg et al., *Predicting Text Entry Speed on Mobile Phones*, Chi 2000, Apr. 1-6, 2000, pp. 9-16.

* cited by examiner

FIGURE 3

| letter to be selected | 1st key entry | 2nd key entry |
|---|---|---|
| A | 2 | 1 |
| B | 2 | 2 |
| C | 2 | 3 |
| D | 3 | 1 |
| E | 3 | 2 |
| F | 3 | 3 |
| G | 4 | 4 |
| H | 4 | 5 |
| I | 4 | 6 |
| J | 5 | 4 |
| K | 5 | 5 |
| L | 5 | 6 |
| M | 6 | 4 |
| N | 6 | 5 |
| O | 6 | 6 |
| P | 7 | 7 |
| R | 7 | 8 |
| S | 7 | 9 |
| T | 8 | 7 |
| U | 8 | 8 |
| V | 8 | 9 |
| W | 9 | 7 |
| X | 9 | 8 |
| Y | 9 | 9 |
| Q | 7 | * |
| Z | 9 | # |

FIGURE 5

| symbol to be selected | 1st key entry | 2nd key entry |
|---|---|---|
| ! | 1 | 1 |
| @ | 1 | 2 |
| $ | 1 | 3 |
| % | 1 | * |
| & | 1 | # |
| ( | 3 | * |
| ) | 3 | # |
| : | 4 | * |
| / | 6 | # |
| + | * | * |
| - | * | # |
| ? | 0 | * |
| " | 0 | # |
| . | # | * |
| , | # | # |
| * | * | 0 |
| # | # | 0 |

FIGURE 7

| letter to be selected | 1st key entry | 2nd key entry |
|---|---|---|
| A | 2 | 2 |
| B | 2 | 5 |
| C | 2 | 8 |
| D | 3 | 3 |
| E | 3 | 6 |
| F | 3 | 9 |
| G | 4 | 1 |
| H | 4 | 4 |
| I | 4 | 7 |
| J | 5 | 2 |
| K | 5 | 5 |
| L | 5 | 8 |
| M | 6 | 3 |
| N | 6 | 6 |
| O | 6 | 9 |
| P | 7 | 1 |
| R | 7 | 4 |
| S | 7 | 7 |
| T | 8 | 2 |
| U | 8 | 5 |
| V | 8 | 8 |
| W | 9 | 3 |
| X | 9 | 6 |
| Y | 9 | 9 |
| Q | 7 | 0 |
| Z | 9 | 0 |

FIGURE 9

| letter to be selected | 1st key entry | 2nd key entry |
|---|---|---|
| A | 2 | 2 |
| B | 2 | 5 |
| C | 2 | 8 |
| D | 3 | 3 |
| E | 3 | 6 |
| F | 3 | 9 |
| G | 4 | 1 |
| H | 4 | 4 |
| I | 4 | 7 |
| J | 5 | 2 |
| K | 5 | 5 |
| L | 5 | 8 |
| M | 6 | 3 |
| N | 6 | 6 |
| O | 6 | 9 |
| P | 7 | 1 |
| Q | 7 | 4 |
| R | 7 | 7 |
| S | 7 | * |
| T | 8 | 2 |
| U | 8 | 5 |
| V | 8 | 8 |
| W | 9 | 3 |
| X | 9 | 6 |
| Y | 9 | 9 |
| Z | 9 | # |

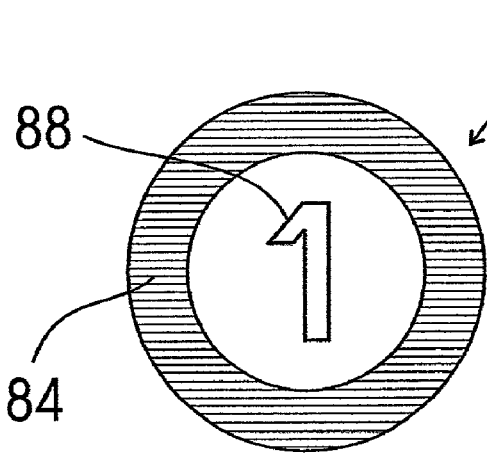
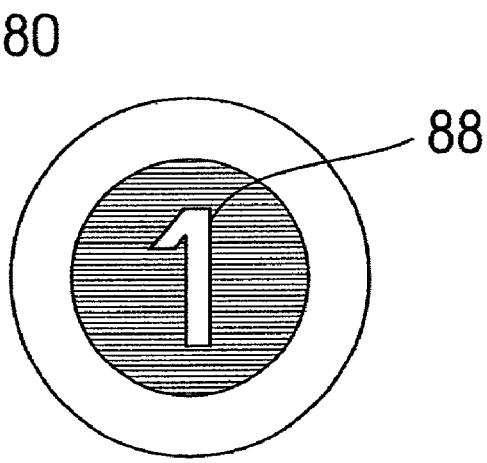
FIG. 11A    FIG. 11B
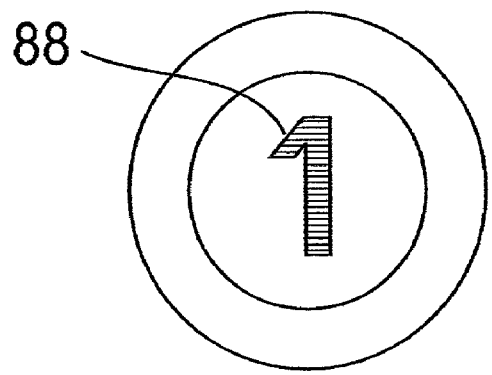
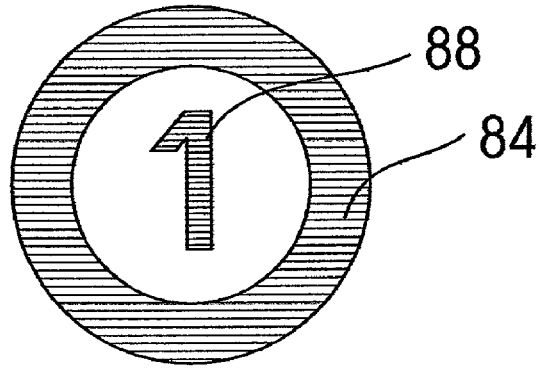
FIG. 11C    FIG. 11D
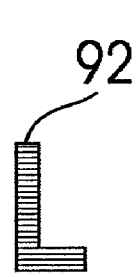
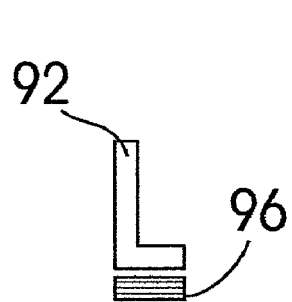
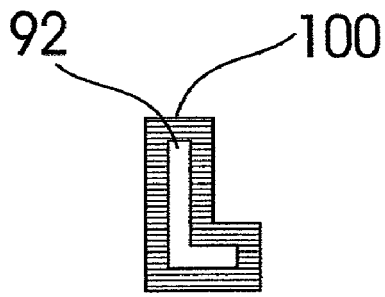
FIG. 12A    FIG. 12B    FIG. 12C

APPARATUS AND METHOD USING COLOR-CODED OR PATTERN-CODED KEYS IN TWO-KEY INPUT PER CHARACTER TEXT ENTRY

TECHNICAL FIELD

The invention is in the field of alphanumeric keyboards. More particularly, the invention relates to the ability to enter letters on a phone keyboard by using two keys for each letter.

BACKGROUND

With the advent of the information age, composing text with the keys of telecommunication devices has become commonplace. For example, consumers are frequently called upon to spell out words using the keys of a phone pad. Entering text with phones has proven to be awkward, since there are many more letters (26 in the English alphabet) than keys on a standard phone keyboard (generally 12). This necessitates that more than one key be chosen to specify a single letter, thereby resulting in a relatively low text entry rate. The small size of the typical cell phone presents further special challenges, since both the size of the text input area and the number of any additional keys on the cell phone may be limited. While graphical keyboards with alternative key layouts are becoming more popular, the learning curve associated with their text input language can be steep.

FIG. 1 shows a phone layout 20 that includes 12 different keys designated by the numeral 24, which are arranged in 4 (horizontal) rows and 3 (vertical) columns. Ten of the keys 24 have a numeral (0, 1, 2, . . . 9) thereon, denoted by the numeral 28. In addition, the letters (denoted by the numeral 32) of the English alphabet, along with special symbols 36 (* and #), are displayed among the keys 24. The 26 letters of the English alphabet are distributed in alphabetically arranged groups among the numeral-bearing keys 2-9, with each of these groups including at least 3 letters. (The letters S and Z are conventionally assigned to the keys 7 and 9, respectively, although other configurations can be used, e.g., these letters may be displayed on the key 1.) Thus, the letters A, B, and C are assigned to the key 2, the letters D, E, and F are assigned to the key 3, and so on. While the conventional layout shown is not necessarily optimal for the purpose of text input, this layout and ones similar to it have nevertheless become the de facto phone layout standards, and are thus the layouts to which text entry methods and apparatuses conform. (Although the keys 24 shown in FIG. 1 are common to almost all phones, many cell phones include additional keys and switches for which there may be no common standard.)

In order to use one of the standard phone key layouts for text entry, it is necessary to use a technique that distinguishes or "disambiguates" which letter 32 on a given key 24 is the intended one, since a group of letters is generally assigned to a single key. One way of doing this is to algorithmically disambiguate letters with an electronic dictionary of common words (the so-called T-9 technique). In this technique, only one key is tapped for each letter, and a microprocessor or computer in communication with the keypad checks the dictionary to resolve any ambiguity. For example, entering the key sequence 9-WXYZ, 6-MNO, 7-PQRS, 5-JKL, 3-DEF, in that order, would result in the word "WORLD". However, this method requires a dictionary that may not contain special words (such as people and place names). Additionally, short words consisting of three or four letters can be difficult to disambiguate. Thus, entering the key sequence 4-GHI, 2-ABC, 6-MNO, 3-DEF could correspond to either the word "GAME" or "HAND". Accordingly, this method may require that the user pay close attention to the text as it is being generated and make any necessary corrections as he or she proceeds, thereby slowing the text entry rate.

Another disambiguation technique is the so-called multi-tap technique. In this technique, the number of taps on a given key specifies the desired letter by the ordering of the letters within the group of letters on the key being tapped. For example, tapping the key 2-abc just once produces the letter A, tapping this key twice produces the letter B, and tapping it three times produces the letter C. Since the number of taps varies from letter to letter, however, some users find this approach counterintuitive and unsatisfactory.

In a two-key sequence method, the user presses two keys consecutively to uniquely determine a letter or symbol. As discussed by M. Silfverberg et al., ("Predicting text entry speed on mobile phones", Chi 2000, 1-6 Apr. 2000), the keys 1, 2, 3, and 4 can be used to disambiguate the intended letter on a key. For example, 7-PQRS followed by 1 corresponds to the letter P; 7-PQRS followed by the key 2 corresponds to the letter Q; 7-PQRS followed by the key 3 corresponds to the letter R; and 7-PQRS followed by the key 4 corresponds to the letter S. In another two-key sequence method taught by Burrell in U.S. Pat. No. 6,043,761, the keys *, 0, # are used to specify the intended letter within a group of letters. Thus, the letter J is input as 5*, the letter K as 50, and the letter L as 5#. Although these two-key sequence methods are conceptually straightforward, users may be frustrated that some of the two-key sequences involve keys at opposite ends of the keypad, which can result in a slow text entry rate.

Thus, there remains a need for a simple, time-efficient, easy-to-learn text entry method tailored to a standard key layout.

SUMMARY OF THE INVENTION

Methods and apparatuses are disclosed herein that involve two-keys per character text entry, in which two keys in a single row (or column) are used to specify each letter.

In one implementation of the invention, there is a method of electronically selecting language characters. The method includes providing a keyboard that includes a plurality of keys, in which each of the numerals 0 through 9 inclusive is displayed on a respective one of the keys, and each of at least 8 of the numeral-displaying keys further has language characters displayed thereon. For each one of said 8 keys, a plurality of the characters displayed thereon have respective associated markings such that any given character marking on that key is uniquely identified with a single displayed character. A plurality of the keys have respective markings that visually match the character markings. The method includes selecting a first character displayed on a first one of said 8 keys (in which the first character has a first marking), by first selecting the first key and then selecting a key displaying the first marking. The method further includes selecting a second character displayed on the first one of said 8 keys (in which the second character has a second marking), by first selecting the first key and then selecting a key displaying the second marking, with the selected key displaying the first marking and the selected key displaying the second marking being different. In a preferred implementation, all the letters of the English alphabet are input into the electronic component using this methodology.

One embodiment of the invention is a keyboard that includes keys arranged in rows and columns. The keys form a keyboard layout, and a plurality of the keys have respective markings. The numerals 0, 1, 2, 3, 4, 5, 6, 7, 8, and 9 are displayed on respective ones of the keys. In addition, language characters are displayed on the keys, with each of at least 8 of the numeral-displaying keys having language characters displayed thereon. On each of said 8 keys, a plurality of the language characters have respective markings such that any given marking on that key is uniquely associated with a single language character, with the key markings visually corresponding to the character markings.

In another implementation of the invention, there is provided a method of electronically selecting letters. The method includes providing a keyboard that includes keys, with the numerals 0-9 being displayed on respective keys. Letters of the English alphabet are displayed on the numeral-displaying keys, and the letters displayed on any given key have different colors. The method farther includes providing keys of the keyboard with colors corresponding to the colors of the letters, and selecting letters through a two-key sequence of a first key and a second key. The first key is given by the numeral-displaying key on which a desired letter is displayed, and the second key is given by a key having a color that matches the color of the desired letter. In a preferred implementation, all the letters of the English alphabet are input into the electronic component using this methodology.

In one embodiment of the invention, an electronic device includes a keyboard that includes keys. The numerals 0-9 are displayed on respective keys, and letters of the English alphabet are displayed on the numeral-displaying keys. The letters displayed on any given key have different colors, and the keys are color-coded with colors corresponding to the colors of the letters. The electronic device further includes an electronic component in communication with the keyboard, with the component registering which keys on the keyboard are selected. The component includes instructions for converting sequences of two keys into letters, in which each letter is registered by first selecting the key on which the letter to be registered is displayed, and then selecting a key that is color-coded with a color matching that of the letter to be registered.

BRIEF DESCRIPTION OF THE DRAWINGS

FIGS. 2A, 2B, and 2C, shows text being entered with a standard keyboard by using 2 keys to define each letter.

FIG. 3 gives a preferred set of coding sequences for the keyboard of FIG. 1.

FIG. 5 gives a preferred set of coding sequences for the keyboard of FIG. 4.

FIG. 7 gives a preferred set of coding sequences for the keyboard of FIG. 6.

FIG. 9 gives a preferred set of coding sequences for the keyboard of FIG. 8.

FIG. 11, which includes FIGS. 11A, 11B, 11C, and 11D, shows how markings can be placed in and around a key and its associated numeral.

FIG. 12, which includes FIGS. 12A, 12B, and 12C, shows how markings can be placed in and around a letter.

FIG. 13, which includes

DETAILED DESCRIPTION OF THE INVENTION

Figure 2:
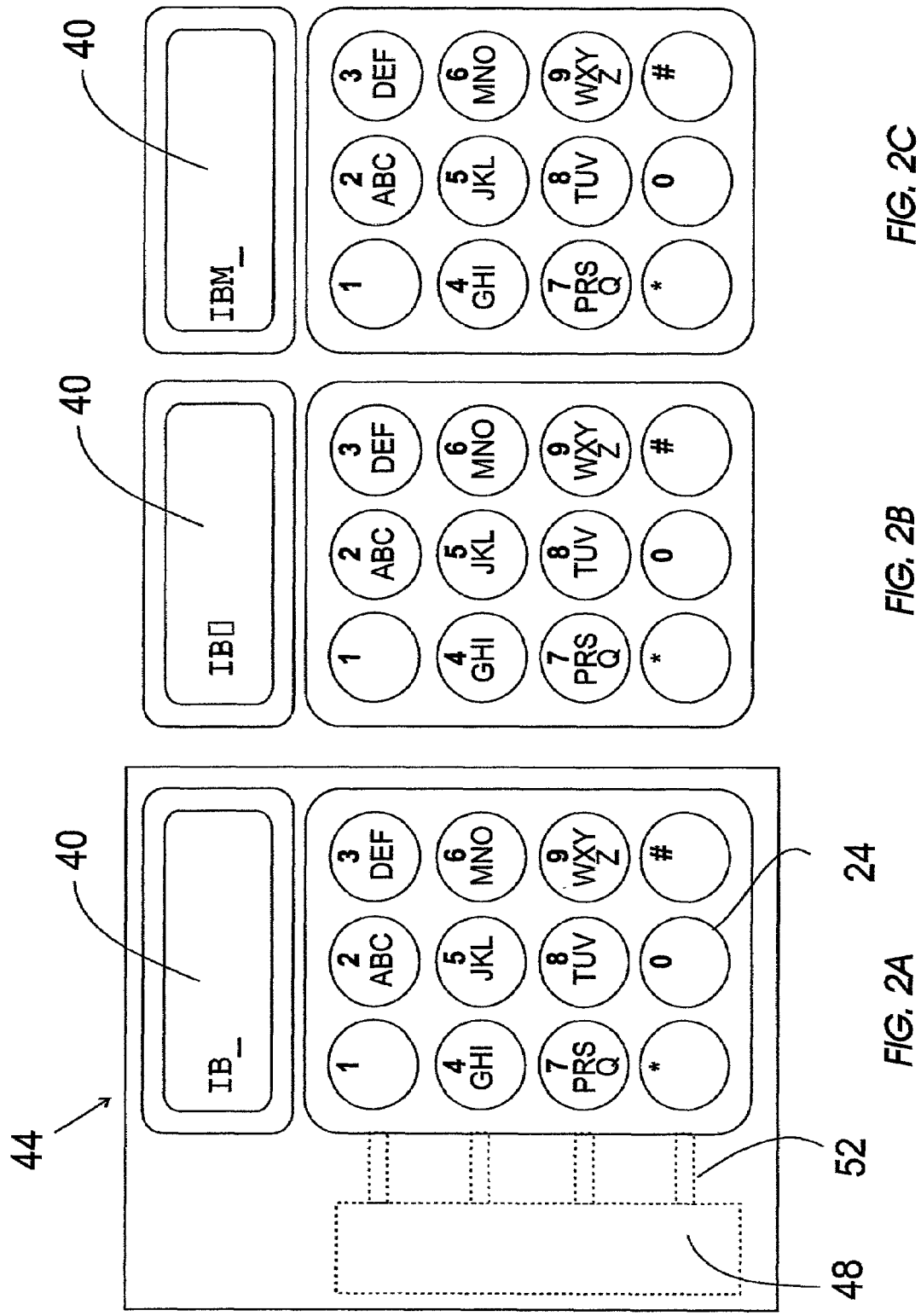
FIG. 2, which includes

Preferred implementations of the invention provide the user with the ability to conveniently enter text using only two key strokes. A first embodiment is described with respect to the standard layout shown in FIGS. 2A-C, in which letters are entered by selecting two keys that share a common row oriented along a particular dimension, for example, a horizontal row. (Alternatively, the two keys used to define a given letter may be located in the same column, as discussed below.) Although preferred embodiments herein are described with respect to English language letters and symbols, characters from any language may be used, such as those used in a writing system. As shown in FIG. 2A, a user has already entered the letters I and B onto a screen 40 of a communications device 44 (by selecting the combinations 4, 6; and 2, 2, respectively, as discussed below). FIGS. 2A-2C show how selecting the keys 6 and 4, in that order, defines a third letter, namely M, which then appears on the screen 40. As suggested by FIG. 2B, after the user has selected the key 6, but before selecting the key 4, the symbol ▫ appears, indicating to the user that another key selection is necessary to produce (define) a letter. As indicated in FIG. 2C, after the user selects the key 4, the letter M appear on the screen 40.

The keys 24 are each in electrical communication with an electronic component 48 such as a processor or a computer that records signals transmitted from the keys via wires 52 or the like to the processor. (The processor 48 and the wires 52 are not shown in FIGS. 2B and 2C for clarity.) The processor 48 contains instructions for converting key sequences into letters that are then displayed on the screen 40 and can later be sent electronically to a remote device. (Alternatively, the communication device 44 may not have a screen, i.e., the methods and apparatuses herein may be used to enter text electronically to a remote device over standard phone lines, such as when a caller spells out a name with the keys on a phone's keyboard, for example.)

In this embodiment, a consistent scheme is used, with each letter requiring two "taps" or key inputs. The first key to be inputted for a given letter is simply that key on which the letter appears; the second key in the sequence is in the same row as the first key and is given by the position of the given letter within its corresponding group of letters. Thus, the first key in the two-key sequence required for the letter I is the numeral 4 key. Since the letter I occupies the third spatial position (here: the right hand side) within its group of letters GHI on the numeral 4 key, the second key required to produce the letter I is that key in the third column of keys that shares a common row with the numeral 4 key (i.e., the numeral 6 key). Likewise, the letter B is selected by first selecting the numeral 2 key, and then selecting the numeral 2 key a second time (since the letter B occupies the second spatial position (here: the middle) within its group of letters ABC on the numeral 2 key, and the numeral 2 key is in the second column of keys). Finally, the letter M is input onto the screen 40 by first selecting the key on which the letter M appears (i.e., the numeral 6 key) followed by that key in the first column of the row that includes the numeral 6 key (i.e., the numeral 4 key), since the letter M appears in the first spatial position (here: the left hand side) within its group of letters MNO.

Figure 1:
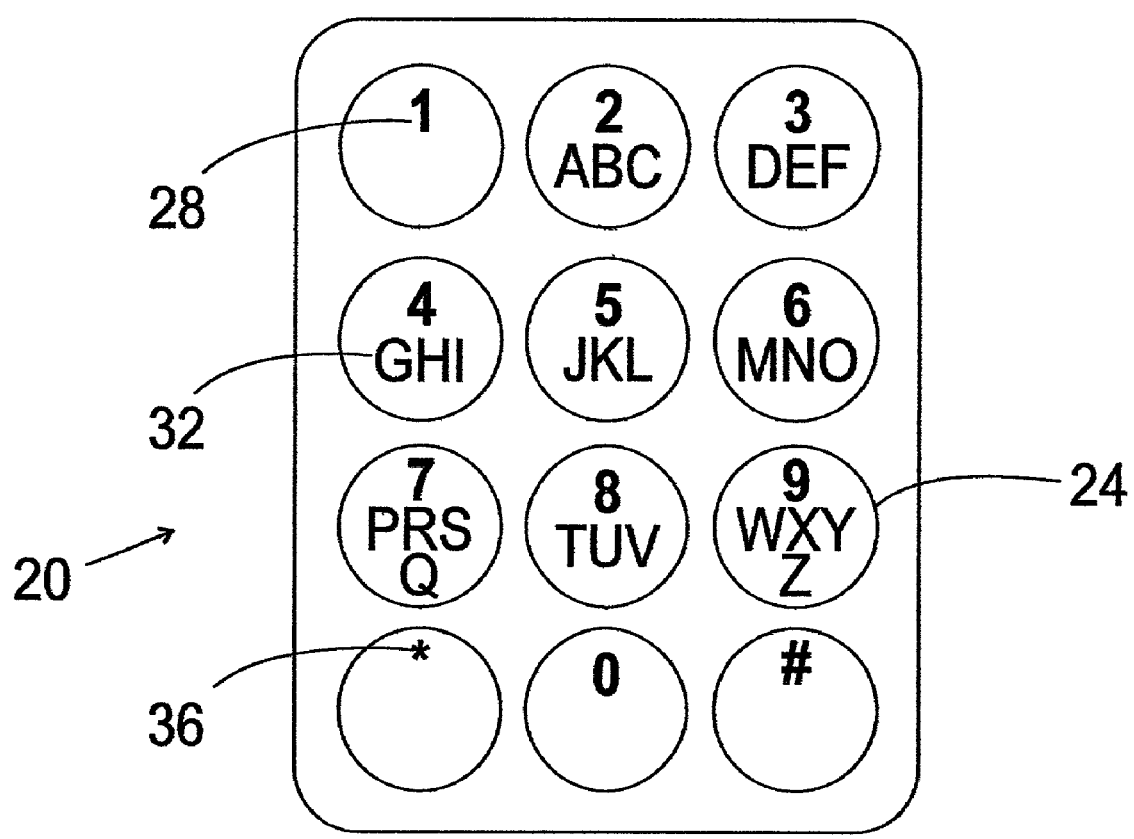
FIG. 1 shows a keypad (keyboard) having a standard layout, in which letters are laid out in groups of three or four on those keys displaying the numerals 2 through 9 inclusive.

Other letters are input using analogous methodology, as shown in FIG. 3, which lists all 26 letters of the English alphabet along with the two-key coding scheme of this particular method. The only exceptions to the pattern outlined here are with respect to the letters Q and Z, which are necessitated by the fact that these letters are included on the keys 7 and 9, respectively (see FIG. 1). For these 2 letters, the second key in the 2-key sequence is taken to be * and #, respectively, although other combinations for these letters may work well also. (For example, one may define Q by 7, 0; and Z by 9, 0. Alternatively, Q and Z may have more than one two-key sequence that defines them.)

An advantage of the key coding sequences of FIG. 3 is that the user enters letters by working within the same row, thereby reducing the time it takes to complete the two-key sequence, as a result of the shorter distance moved by the user's finger. Further, these sequences follow an intuitive, regular pattern, and therefore they are easier to execute. The pattern is such that a user can learn the two-key sequences well enough to be able to "type" in letters without even looking at the keys. Additionally, this two-key sequence methodology, as well as other methodologies herein, do not necessarily require any hardware changes, as it may be sufficient to load computer code onto an existing device, thereby programming the device to recognize two-key sequences as certain letters.

Numbers may be entered according to one of a number of methodologies. One is to have dedicated modes for entering numbers and letters, so that when the number mode is activated, depressing only a single key is needed to enter numbers. For example, the # key can be designated for this purpose, so that keys entered after it is depressed are interpreted as numbers. (In this case, the letter Z may be advantageously defined by a sequence that does not involve the # key.) According to this arrangement, the key sequence #, 1, 2, 3, 4 would produce the numbers 1, 2, 3, and 4 as text on the screen 40. In a similar fashion, # key can be used to switch back to letter mode from the number mode. An advantage to using a dedicated mode for numbers is that only one key is needed to produce numbers, rather than two, as in the case of letters. The user can be made aware of the mode currently in use through a visual indication to that effect. For example, the symbol used for the cursor (shown on the screen 40 in FIGS. 2A and 2B as an underscore ) can be changed to the # sign when the mode currently in use is the number mode, and then changed back to an underscore when the letter mode is the current mode. Alternatively, the word "number" or "letter" may be displayed in a corner of the screen 40, as appropriate.

Furthermore, mode switching between numbers and letters may in some embodiments be automatic. For example, if the user is prompted to enter a name (e.g., through menu selection), the default mode may advantageously be automatically set to letters rather than numbers. Likewise, if the user were prompted to enter a social security number, the default mode may advantageously be automatically set to numbers rather than letters.

Another way of entering numbers is a two-key coding approach that is similar in some respects to the one described above for entering letters. In one implementation, the key 0 (or another key, such as #) is used to indicate that the character being entered is a number. For example, to enter the number 1064, the user selects 1, 0 (to produce 1); 0, 0 (to produce 0); 6, 0 (to produce 6); and 4, 0 (to produce a 4). An advantage of this approach is that it is enjoys a certain consistency with the coding scheme used for letters, which are also defined by a sequence of two keys.

Figure 4:
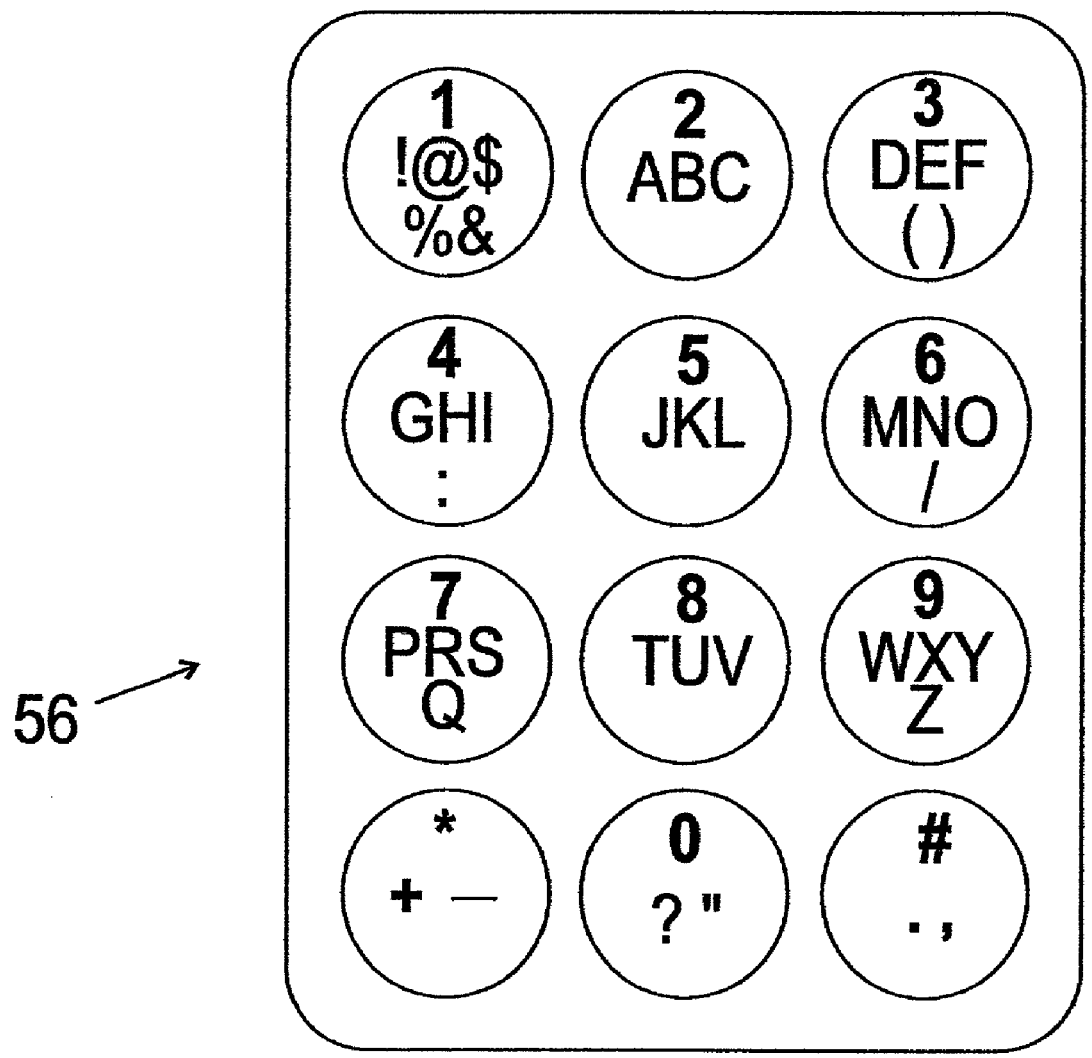
FIG. 4 shows a keyboard similar to the one of FIG. 1, but which includes several special symbols.

Although symbols are generally not included on standard key layouts, some symbols (such as @, /, and .) that are necessary for entering e-mail addresses, web addresses, etc. have begun to appear on cell phone layouts. One approach for addressing this need is by putting common symbols on underutilized keys such as 1, 0, *, and #. In this manner, at least 12 special symbols can be easily added to the layout of FIG. 1 to cover the most commonly used symbols. In another approach, a symbol is added to each key below the group of letters, with that symbol being entered as text by first selecting the key on which it is displayed, and then selecting the key below it (or above it). For example, to enter a symbol displayed underneath the group of letters ABC on the numeral 2 key, the user could hit the numeral 2 key followed by the numeral 5 key. Alternatively, dedicated modes, such as that described above with respect to the input of numbers, can be used. FIG. 4 shows a keypad or keyboard 56 with symbols displayed on a number of keys, and one preferred coding sequence for these symbols is outlined in FIG. 5.

Figure 6:
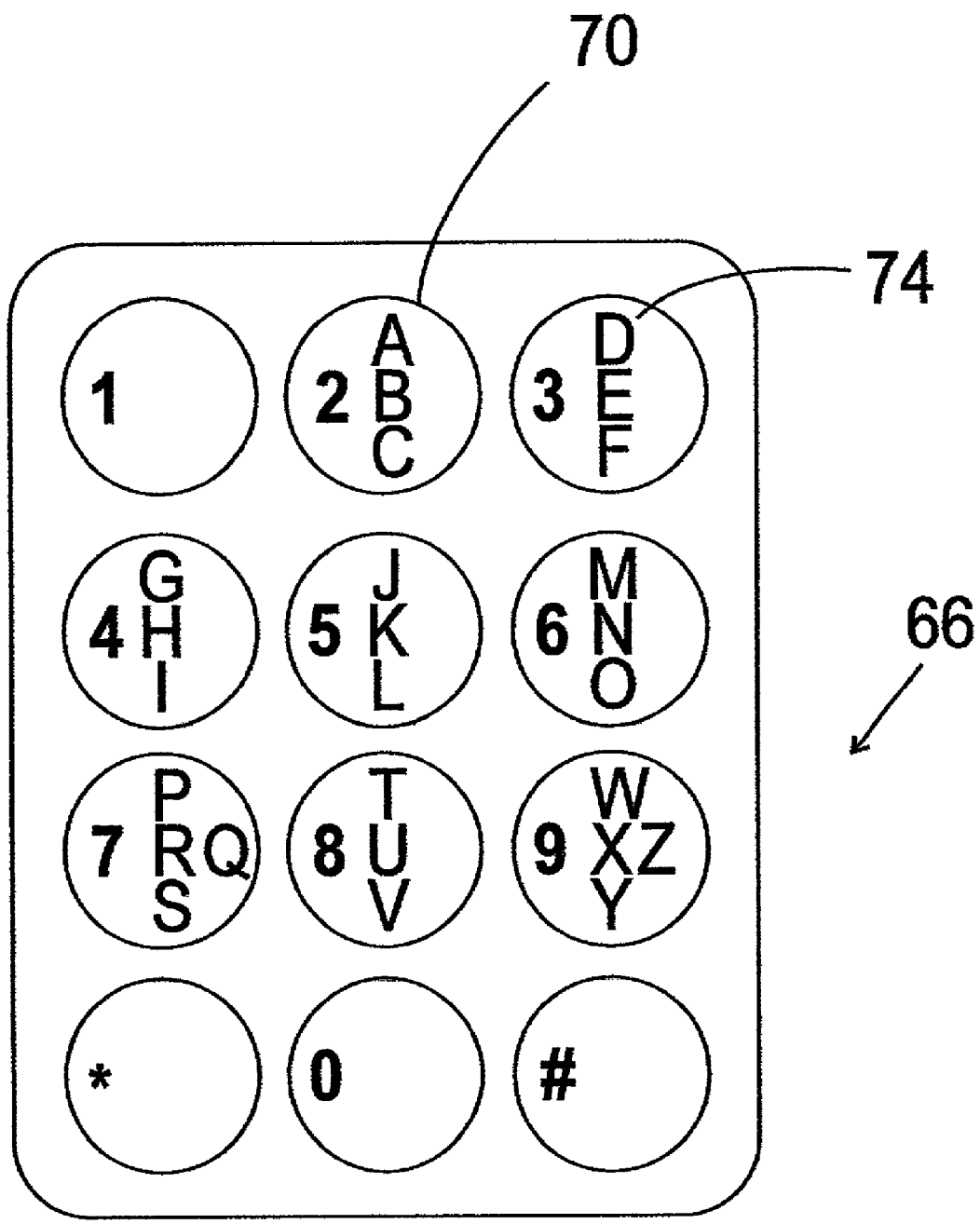
FIG. 6 shows a keyboard in which letters are arranged vertically on the keys displaying the numerals 2 through 9 inclusive.

Other embodiments are now described in which two keys located in the same column are used to define a given letter. This approach may be most appropriate for a layout such as the one shown in FIG. 6. Keyboard 66 includes a key 70 for each of the numerals 0-9 inclusive, with letters 74 of the English alphabet being displayed among the keys. These letters 74 are arranged in a top-to-bottom arrangement and occupy top, middle (center), and bottom spatial positions within their respective groupings. One preferred set of coding sequences that can be used with the keyboard 66 of FIG. 6 is given in FIG. 7. The letter J, for example, can be entered as text on a screen (not shown in FIG. 6) through the two-key sequence given by the numeral-displaying keys 5, 2. The first key in this sequence is simply the key on which the letter J is displayed (i.e., the numeral 5 key), and the second key in this sequence is in the first row (here: the top row) of the column in which the numeral 5 key resides (corresponding to the first spatial position (here: the top spatial position) of the letter J within its group of 3 letters JKL).

With respect to the embodiment of FIGS. 6 and 7, the first key in the two-key sequences for K and L is likewise simply the key on which those letters are displayed (i.e., the numeral 5 key). The letter K is selected through the sequence 5, 5. With respect to the second key in this sequence, the letter K occupies the second spatial position (here: the middle or center spatial position) within the group of letters JKL, and the numeral 5 key resides in the second row (here: the middle row) of keys within the 3×3 matrix of keys displaying the numerals 1-9. The letter L is selected through the sequence 5, 8. With respect to the second key in this sequence, the letter L occupies the third spatial position (here: the bottom spatial position) within the group of letters JKL, and the numeral 8 key resides in the third row (here: the bottom row) of keys within the 3×3 matrix of keys displaying the numerals 1-9.

In preferred embodiments herein, each of the numerals 0-9 is displayed on a respective key, and 8 of those keys have 3 (or more) letters displayed thereon. Variations on the letter coding sequences indicated in FIGS. 3 and 7 are possible without departing from the spirit of the invention. However, in preferred embodiments, it is generally the case that the spatial position of a letter within a group of letters on its respective key is associated with the second of two key selections that make up the coding sequence for that letter, whereas the first of the two key selections is given by the key on which the letter is displayed. (Exceptions can be made when it is advantageous to do so, for example, with the letters Q and Z.) Such a coding sequence arrangement is preferably used for letters on keys in each of 2 rows and for letters on keys in each of 2 columns, in which the rows and columns reside within a 3×3 matrix of numeral-displaying keys arranged in 3 rows and 3 columns.

Figure 8:
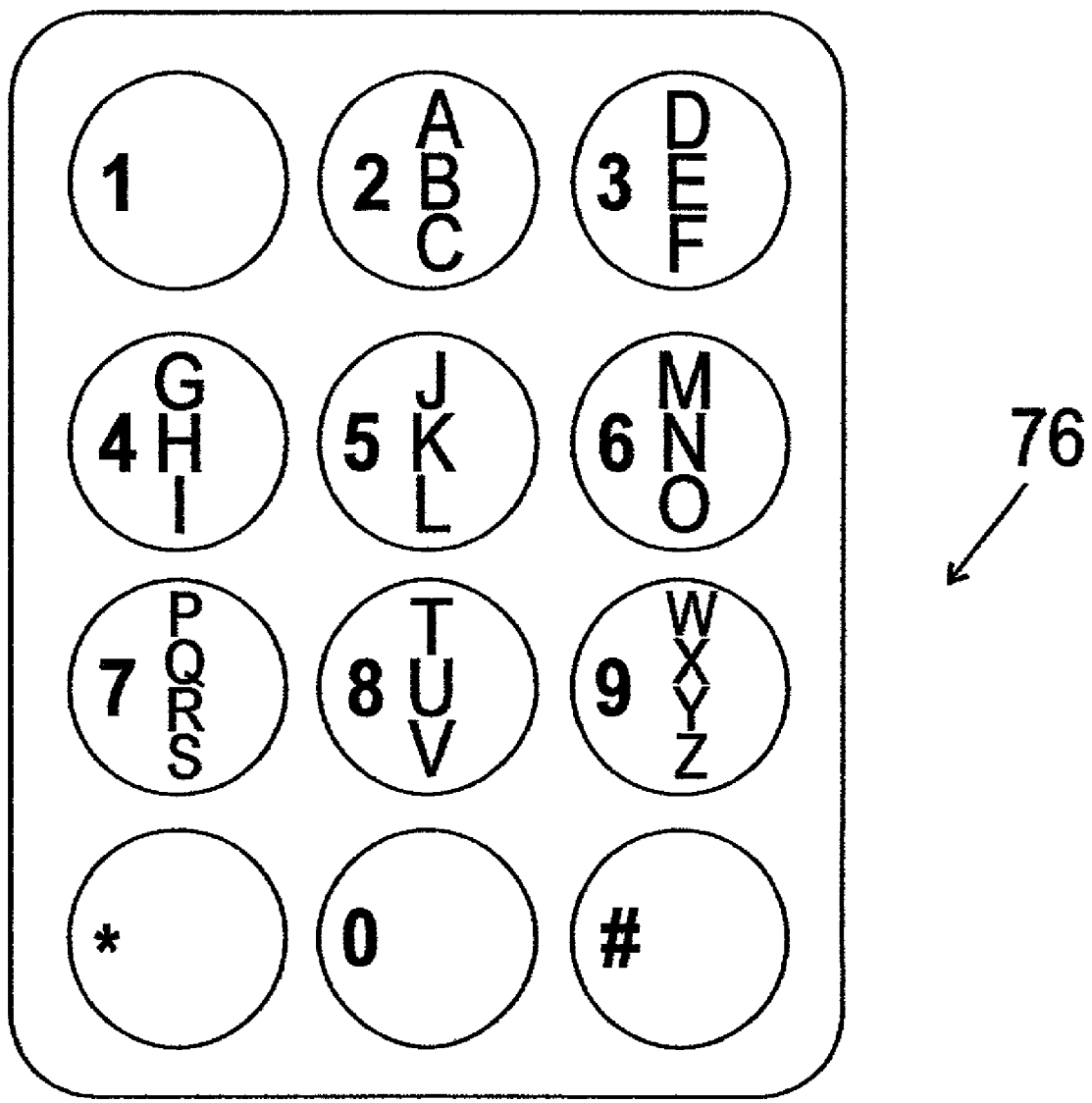
FIG. 8 shows another keyboard in which letters are arranged vertically on the keys displaying the numerals 2 through 9 inclusive.

Another embodiment is illustrated in FIG. 8, which has a keyboard that looks like the one shown in FIG. 6, except for the layout of the letters on the numeral 7 key and the numeral 9 key. A coding sequence that may be used for the embodiment of FIG. 8 is shown in FIG. 9, which differs from the coding sequence of FIG. 7 with respect to the letters Q, R, S, X, Y, and Z. This embodiment offers the user easy-to-learn coding sequences with respect to the letters on the numeral 7 and the numeral 9 keys: The second key in the 2-key sequence for a desired letter that occupies the fourth spatial position is advantageously that key in the fourth row of the column containing the key on which the desired letter is displayed (with the first, second, and third spatial positions likewise corresponding to the first, second, and third rows, respectively). In addition, the keyboard 76 may be advantageously adapted to include a number of symbols. For example, the total number of letters and symbols vertically displayed on several of the keys may be 4, and a 2-key sequence may be employed in which the first key selected is that key on which the desired letter (or symbol) is displayed, and the second key in the sequence is determined by whether the desired letter occupies the first, second, third, or fourth spatial position on its corresponding key.

Figure 10:
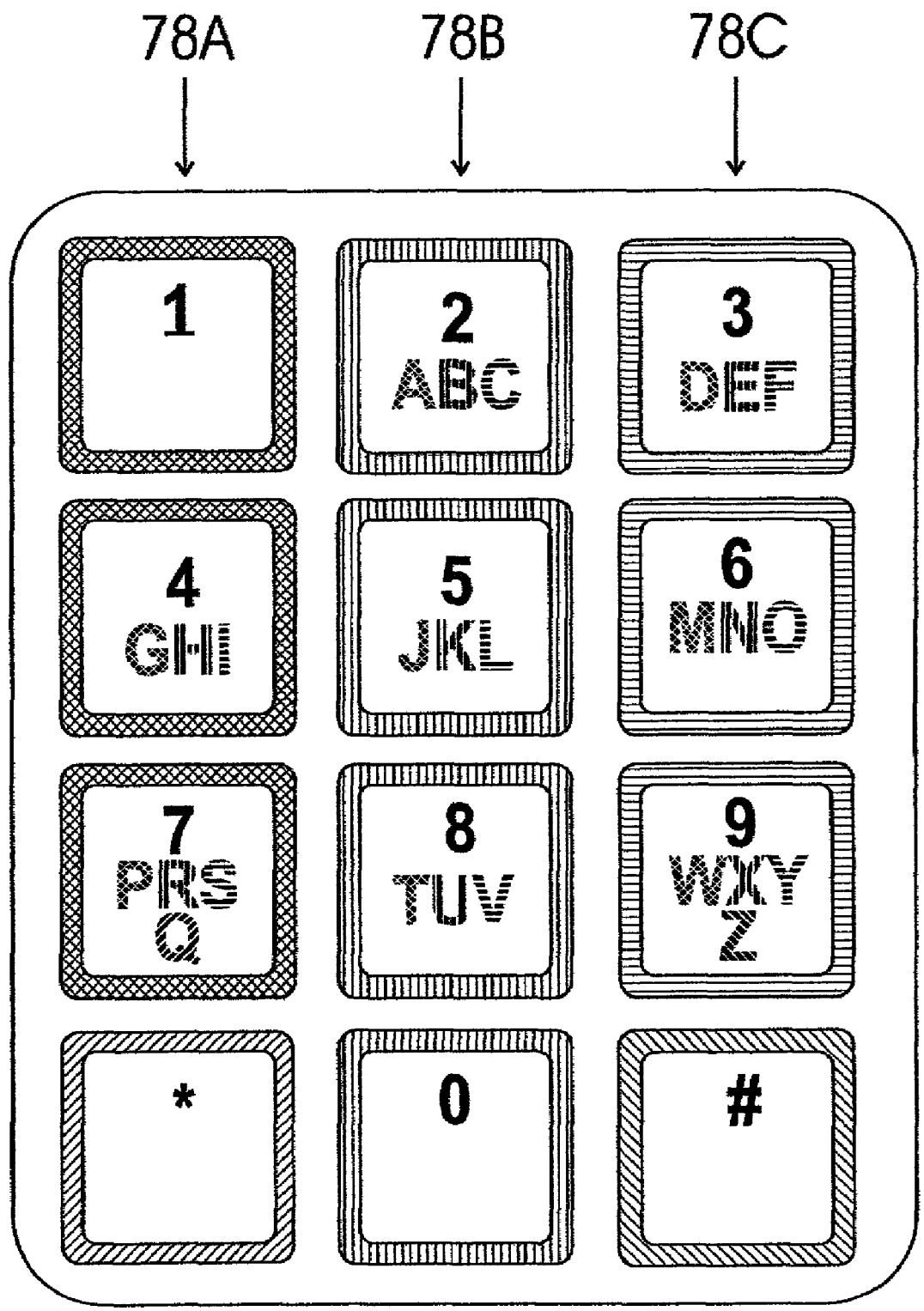
FIG. 10 shows a keyboard in which the letters and the keys are associated through markings that help the user input the appropriate sequence of keys for a given letter.

The text entry rate associated with the methodologies described herein may be increased through visual encoding or marking of the keys and letters. FIG. 10 shows a preferred method and apparatus for visual encoding, in which each column of keys is marked or "tagged" with a different color, such as yellow for the keys 1, 4, 7 (in a first column 78a), red for the keys 2, 5, 8 (in a second column 78b), and green for the keys 3, 6, 9 (in a third column 78c). Colors are indicated in FIG. 10 through the use of different cross hatching patterns. As indicated by the hatching patterns, the letters themselves are also advantageously colored so that they match the color of the second key in the two-key coding sequence. For example, the letters G, P, A, J, T, D, M, and W are colored yellow to match the keys 1, 4, and 7; the letters H, R, B, K, U, E, N, and X are colored red to match the keys 2, 5, and 8; and the letters I, S, C, L, V, F, O, and Y are colored green to match the keys 3, 6, and 9. Thus, each letter on a given key advantageously has a different color, and keys in different columns also have different colors, with the colors of the keys and the colors of the letters matching each other in accordance with the corresponding coding sequence. As indicated in FIG. 10, the letter Q and the * key may have matching colors (e.g., purple), and the letter Z and the # key may also have matching colors (e.g., pink). In preferred coloration embodiments herein, white and black may also be used as colors, and the number of colors used may be increased to accommodate special symbols. The coloration arrangement of FIG. 10 thus provides a strong visual cue that reinforces the coding sequences outlined in FIG. 3, thereby helping the user to rapidly and accurately select the appropriate coding sequence for a given letter.

In other embodiments, markings other than colors are used as an aid to selecting keys according to a given coding sequence. For example, the markings on the keys and letters may include matching patterns (instead of or in addition to colors), such as the very patterns in FIG. 10 used to represent different colors in the embodiment discussed above. In the case that patterns are used, one letter in each of the groups of three letters shown in FIG. 10 may be left "unpatterned", since the lack of a pattern may act to distinguish the unpatterned letter from those letters that have patterns. Thus, in one patternation embodiment that can be used with the key layout shown in FIG. 10, only two of the three letters have patterns associated with them.

The markings of the keys and the letters, whether they be patterns or colors, can be laid out in different ways. FIGS. 11A-11D show various possibilities for marking a numeral-displaying key 80 (by way of example, the numeral 1 key). FIG. 11A shows a marked border region 84, which may either form part of (or surround) the key 80. In FIG. 11B, the key 80 itself (or a portion of it) is marked, and FIG. 11C illustrates how the numeral itself (designated by the numeral 88) may be marked. FIG. 11D illustrates a marking arrangement that combines the markings shown in FIGS. 11A and 11B.

FIGS. 12A-12C illustrate how a letter 92 (by way of example, the letter L) can be marked. The letter 92 itself can be marked (to match the numeral 1 key) as in FIG. 12A. Alternatively, a marking 96 can be placed next to the letter 92 (as in FIG. 12B), or a marking 100 can be placed around the letter 92 (as shown in FIG. 12C).

In another preferred embodiment, the keys and letters of the keyboard 66 shown in FIG. 6 are tagged with markings such as colors, so that, for example, the coding sequence of FIG. 7 is reflected in the colors selected for the keys and the letters of the keyboard 66. Thus, the letters A, D, G, J, M, P, T, and W and the keys 1, 2, and 3 may marked with a first color (e.g., yellow); the letters B, E, H, K, N, R, U, and X and the keys 4, 5, and 6 may be marked with a second color (e.g., red); and the letters C, F, I, L, O, S, V, and Y and the keys 7, 8, and 9 may be marked with a third color (e.g., green). In addition, the letter Q and the * key may have matching colors (e.g., purple), and the letter Z and the # key may also have matching colors (e.g., pink).

For the embodiment of FIG. 8, the letters A, D, G, J, M, P, T, and W and the keys 1, 2, and 3 may be marked with a first color (e.g., yellow); the letters B, E, H, K, N, Q, U, and X and the keys 4, 5, and 6 may be a marked with a second color (e.g., red); the letters C, F, I, L, O, R, V, and Y and the keys 7, 8, and 9 may be marked with a third color (e.g., green); the letters S and Z and the keys *, 0, and # may be marked with a fourth color (e.g., blue).

In other embodiments, the keys 1, 2, 3, and 4 may each have a separate marking such as a particular color, and each of the letters on each of the keys may have a marking (e.g., a particular color) corresponding to one of the keys 1, 2, 3, 4. For example, the letters A, D, G, J, M, P, T, and W and the key 1 may have a first color such as yellow; the letters B, E, H, K, N, R, U, and X and the key 2 may have a second color such as red; the letters C, F, I, L, O, S, V, and Y and the letter 3 may have a third color such as green; and the letters Q and Z and the key 4 may have a fourth color such as purple. This marking arrangement advantageously corresponds to a key coding sequence in which letters are chosen by selecting two keys, with the first key being that key on which the desired letter is displayed, and the second key being the key 1, 2, 3, or 4 having a color matching that of the desired letter. Alternatively, the keys 7, 8, 9 (or 1, 7, 8, 9) may each have a separate marking (e.g., color) and be used to disambiguate the 3 (or more) letters within each group of letters on the keys. In other embodiments in which more than one key has a given color (or marking), the second key selected in the two-key sequence may be any one of the keys so colored.

Figure 13A:
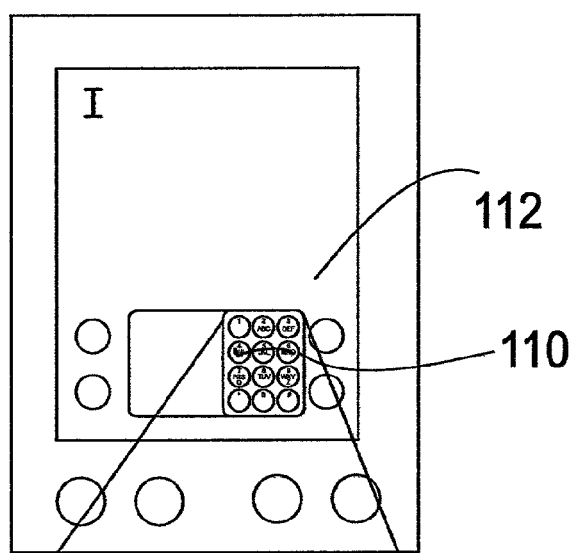
FIGS. 13A, 13B, 13C, and 13D shows how text may be entered onto a keypad using strokes (e.g., from a stylus).
Figure 13C:
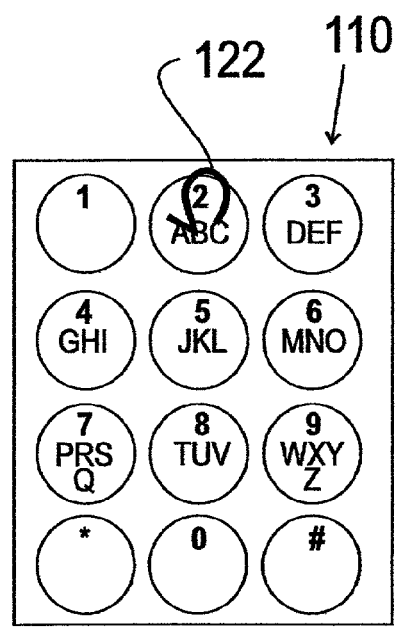
Figure 13B:
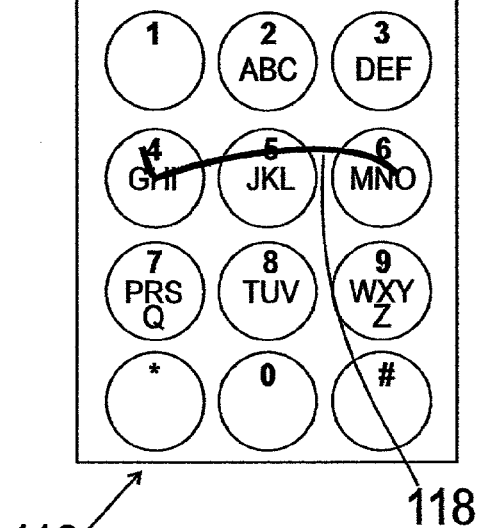
Figure 13D:
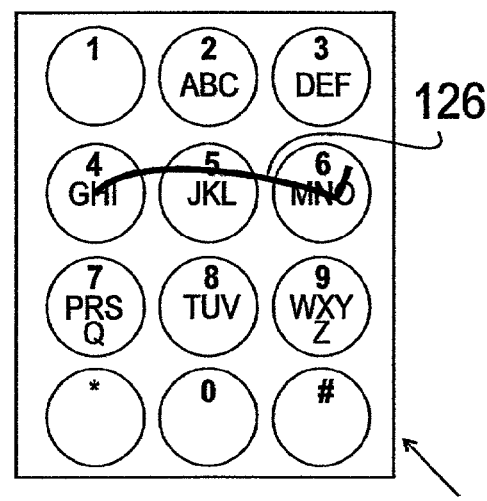

The methods and apparatuses herein are not limited to traditional mechanical keyboards or keypads such as those used in household telephones, but may also be implemented on touch screens having "soft" buttons or keys, such as the one shown in FIG. 13A. With touch screens, key selections may be made with a stylus, so that letters may be "written" through stroking actions. For example, as shown in FIG. 13B, the letter I may be selected on a touch screen keypad 110 of a screen 112 (that is part of a personal communications device 114) by placing a stylus (not shown) on the key 4, followed by a long right stroke or arc 118 extending onto the key 6, and then taking the stylus off the key 6. The letter B can be formed by placing the stylus on the key 2 and then making an arc 122, e.g., a circle that begins and ends on the same key, but at some point goes outside the perimeter of the key, as shown in FIG. 13C. For the letter M, the stylus can be placed on the key 6, followed by a long left stroke or arc 126 extending onto the key 4, as shown in FIG. 13D. Two-key sequences such as these are consistent with the key coding sequences given in FIG. 3, for example.

The touch screen keypad 110 or keyboard may comprise thin glass panels positioned over a CRT or LCD display (not shown). The screen 112 may be a capacitive screen, so that touching the screen perturbs the electric field between the glass panels, resulting in voltage changes (e.g., at the corners of the screen) corresponding to the distance between the screen's corners and the point of contact. With this information, circuitry (including one or more electronic components, such as a microprocessor) in communication with the keyboard can calculate the position of the touched portion of the screen 112 and thereby deduce which key was touched. Alternatively, the touch screen 112 may be a resistive touchscreen that includes two conductive coated layers separated by nonconductive spacer dots. When pressure is applied to the screen, the conductive layers are urged closer together, thus creating a flow of current between the two layers at the contact point, which is then reported to the circuitry in communication with the keypad 110, so that the identity of the touched key can be ascertained.

In more traditional keypads or keyboards used with household phones and cell phones, the keys of the keypad may be interfaced with momentary contact push-button switches that in turn are connected to an electronic component such as a microprocessor that monitors the state of each switch. When the processor finds a circuit that is closed (i.e., when current flows through the circuit), the processor compares the location of that circuit to a table and finds the corresponding entry.

In preferred implementations, electronic circuitry (such as a microprocessor) in communication with a keyboard or keypad includes a buffer into which is input the identity of selected keys. The circuitry then converts key sequences into the appropriate letter or symbol in accordance with the corresponding key coding sequence. The electronic circuitry may include software or hardware for making such conversions. In preferred embodiments herein, letters or other language symbols identified by the electronic circuitry may be advantageously displayed on a display screen and/or sent to a remote electronic device (e.g., over the public telephone network or via wireless techniques).

In preferred embodiments of the invention, there is provided media encoded with executable program code to effect any of the methods described herein. These media may include a magnetic or optical disk or diskette, for example. In preferred embodiments, this program code may be read by a digital processing apparatus such as a computer for performing any one or more of the methods disclosed herein.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A method for use with a keyboard that is interfaced with an electronic component, the keyboard including a 3×3 matrix of keys in which each of the numerals 1 through 9 inclusive is displayed on a respective key, the keyboard including first, second, and third rows, wherein:

the first row includes three keys displaying the numerals 1, 2, and 3, respectively, in that order;

the second row includes three keys displaying the numerals 4, 5, and 6, respectively, in that order;

the third row includes three keys displaying the numerals 7, 8, and 9, respectively, in that order;

the numeral 2 key has the letters A, B, and C thereon;

the numeral 3 key has the letters D, E, and F thereon;

the numeral 4 key has the letters G, H, and I thereon;

the numeral 5 key has the letters J, K, and L thereon;

the numeral 6 key has the letters M, N, and O thereon;

the numeral 7 key has the letters P, Q, R, and S thereon;

the numeral 8 key has the letters T, U, and V thereon; and the numeral 9 key has the letters W, X, Y, and Z thereon;

the method comprising:

inputting the letter A into the electronic component by selecting, in order, the numeral 2 key and the numeral 1 key;

inputting the letter B into the electronic component by selecting, in order, the numeral 2 key and the numeral 2 key;

inputting the letter C into the electronic component by selecting, in order, the numeral 2 key and the numeral 3 key;

inputting the letter D into the electronic component by selecting, in order, the numeral 3 key and the numeral 1 key;

inputting the letter E into the electronic component by selecting, in order, the numeral 3 key and the numeral 2 key;

inputting the letter F into the electronic component by selecting, in order, the numeral 3 key and the numeral 3 key;

inputting the letter G into the electronic component by selecting, in order, the numeral 4 key and the numeral 4 key;

inputting the letter H into the electronic component by selecting, in order, the numeral 4 key and the numeral 5 key;

inputting the letter I into the electronic component by selecting, in order, the numeral 4 key and the numeral 6 key;

inputting the letter J into the electronic component by selecting, in order, the numeral 5 key and the numeral 4 key;
inputting the letter K into the electronic component by selecting, in order, the numeral 5 key and the numeral 5 key;
inputting the letter L into the electronic component by selecting, in order, the numeral 5 key and the numeral 6 key;
inputting the letter M into the electronic component by selecting, in order, the numeral 6 key and the numeral 4 key;
inputting the letter N into the electronic component by selecting, in order, the numeral 6 key and the numeral 5 key;
inputting the letter O into the electronic component by selecting, in order, the numeral 6 key and the numeral 6 key;
inputting the letter T into the electronic component by selecting, in order, the numeral 8 key and the numeral 7 key;
inputting the letter U into the electronic component by selecting, in order, the numeral 8 key and the numeral 8 key; and
inputting the letter V into the electronic component by selecting, in order, the numeral 8 key and the numeral 9 key.

2. The method of claim 1, comprising:
inputting the letter P into the electronic component by selecting, in order, the numeral 7 key and the numeral 7 key;
inputting the letter R into the electronic component by selecting, in order, the numeral 7 key and the numeral 8 key;
inputting the letter S into the electronic component by selecting, in order, the numeral 7 key and the numeral 9 key;
inputting the letter W into the electronic component by selecting, in order, the numeral 9 key and the numeral 7 key;
inputting the letter X into the electronic component by selecting, in order, the numeral 9 key and the numeral 8 key; and
inputting the letter Y into the electronic component by selecting, in order, the numeral 9 key and the numeral 9 key.

3. The method of claim 1, wherein:
the letters A, D, G, J, M, T, the numeral 1 key, the numeral 4 key, and the numeral 7 key are marked with a first color;
the letters B, E, H, K, N, U, the numeral 2 key, the numeral 5 key, and the numeral 8 key are marked with a second color; and
the letters C, F, I, L, O, V, the numeral 3 key, the numeral 6 key, and the numeral 9 key are marked with a third color, in which the first, second, and third colors are different from each other.

4. The method of claim 3, comprising:
inputting the letter P into the electronic component by selecting, in order, the numeral 7 key and the numeral 7 key;
inputting the letter R into the electronic component by selecting, in order, the numeral 7 key and the numeral 8 key; inputting the letter S into the electronic component by selecting, in order, the numeral 7 key and the numeral 9 key;
inputting the letter W into the electronic component by selecting, in order, the numeral 9 key and the numeral 7 key;
inputting the letter X into the electronic component by selecting, in order, the numeral 9 key and the numeral 8 key; and
inputting the letter Y into the electronic component by selecting, in order, the numeral 9 key and the numeral 9 key.

5. The method of claim 4, wherein:
the letters P, W, and the numeral 7 key are marked with the first color;
the letters R, X, and the numeral 8 key are marked with the second color; and
the letters S, Y, and the numeral 9 key are marked with the third color.

6. The method of claim 1, wherein:
the letters A, D, G, J, M, T, the numeral 1 key, the numeral 4 key, and the numeral 7 key are marked with a first pattern;
the letters B, E, H, K, N, U, the numeral 2 key, the numeral 5 key, and the numeral 8 key are marked with a second pattern; and
the letters C, F, I, L, O, V, the numeral 3 key, the numeral 6 key, and the numeral 9 key are marked with a third pattern, in which the first, second, and third patterns are different from each other.

7. The method of claim 6, comprising:
inputting the letter P into the electronic component by selecting, in order, the numeral 7 key and the numeral 7 key;
inputting the letter R into the electronic component by selecting, in order, the numeral 7 key and the numeral 8 key;
inputting the letter S into the electronic component by selecting, in order, the numeral 7 key and the numeral 9 key;
inputting the letter W into the electronic component by selecting, in order, the numeral 9 key and the numeral 7 key;
inputting the letter X into the electronic component by selecting, in order, the numeral 9 key and the numeral 8 key; and
inputting the letter Y into the electronic component by selecting, in order, the numeral 9 key and the numeral 9 key.

8. The method of claim 7, wherein:
the letters P, W, and the numeral 7 key are marked with the first pattern;
the letters R, X, and the numeral 8 key are marked with the second pattern; and
the letters S, Y, and the numeral 9 key are marked with the third pattern.

9. A method for use with a keyboard that is interfaced with an electronic component, the keyboard including a 3×3 matrix of keys in which each of the numerals 1 through 9 inclusive is displayed on a respective key, the keyboard including first, second, and third rows, wherein:
the first row includes three keys displaying the numerals 1, 2, and 3, respectively, in that order;
the second row includes three keys displaying the numerals 4, 5, and 6, respectively, in that order;
the third row includes three keys displaying the numerals 7, 8, and 9, respectively, in that order;
the numeral 2 key has the letters A, B, and C thereon;
the numeral 3 key has the letters D, E, and F thereon;
the numeral 4 key has the letters G, H, and I thereon;

the numeral 5 key has the letters J, K, and L thereon;
the numeral 6 key has the letters M, N, and O thereon;
the numeral 7 key has the letters P, Q, R, and S thereon;
the numeral 8 key has the letters T, U, and V thereon; and
the numeral 9 key has the letters W, X, Y, and Z thereon;
the method comprising:
inputting the letter A into the electronic component by selecting, in order, the numeral 2 key and the numeral 2 key;
inputting the letter B into the electronic component by selecting, in order, the numeral 2 key and the numeral 5 key;
inputting the letter C into the electronic component by selecting, in order, the numeral 2 key and the numeral 8 key;
inputting the letter D into the electronic component by selecting, in order, the numeral 3 key and the numeral 3 key;
inputting the letter E into the electronic component by selecting, in order, the numeral 3 key and the numeral 6 key;
inputting the letter F into the electronic component by selecting, in order, the numeral 3 key and the numeral 9 key;
inputting the letter G into the electronic component by selecting, in order, the numeral 4 key and the numeral 1 key;
inputting the letter H into the electronic component by selecting, in order, the numeral 4 key and the numeral 4 key;
inputting the letter I into the electronic component by selecting, in order, the numeral 4 key and the numeral 7 key;
inputting the letter J into the electronic component by selecting, in order, the numeral 5 key and the numeral 2 key;
inputting the letter K into the electronic component by selecting, in order, the numeral 5 key and the numeral 5 key;
inputting the letter L into the electronic component by selecting, in order, the numeral 5 key and the numeral 8 key;
inputting the letter M into the electronic component by selecting, in order, the numeral 6 key and the numeral 3 key;
inputting the letter N into the electronic component by selecting, in order, the numeral 6 key and the numeral 6 key;
inputting the letter O into the electronic component by selecting, in order, the numeral 6 key and the numeral 9 key;
inputting the letter T into the electronic component by selecting, in order, the numeral 8 key and the numeral 2 key;
inputting the letter U into the electronic component by selecting, in order, the numeral 8 key and the numeral 5 key; and
inputting the letter V into the electronic component by selecting, in order, the numeral 8 key and the numeral 8 key.

10. The method of claim 9, comprising:
inputting the letter P into the electronic component by selecting, in order, the numeral 7 key and the numeral 1 key; and
inputting the letter W into the electronic component by selecting, in order, the numeral 9 key and the numeral 3 key.

11. The method of claim 9, wherein:
the letters A, D, G, J, M, T, the numeral 1 key, the numeral 2 key, and the numeral 3 key are marked with a first color;
the letters B, E, H, K, N, U, the numeral 4 key, the numeral 5 key, and the numeral 6 key are marked with a second color; and
the letters C, F, I, L, O, V, the numeral 7 key, the numeral 8 key, and the numeral 9 key are marked with a third color, wherein the first, second, and third colors are different from each other.

12. The method of claim 11, wherein the letters P and W are marked with the first color.

13. The method of claim 9, wherein:
the letters A, D, G, J, M, T, the numeral 1 key, the numeral 2 key, and the numeral 3 key are marked with a first pattern;
the letters B, E, H, K, N, U, the numeral 4 key, the numeral 5 key, and the numeral 6 key are marked with a second pattern; and
the letters C, F, I, L, O, V, the numeral 7 key, the numeral 8 key, and the numeral 9 key are marked with a third pattern, wherein the first, second, and third pattern are different from each other.

14. The method of claim 13, wherein the letters P and W are marked with the first pattern.

* * * * *